(12) United States Patent
Rogers (10) Patent No.: US 10,372,794 B1
(45) Date of Patent: Aug. 6, 2019

(54) THREE-DIMENSIONAL NETWORK MAPPING SYSTEM AND METHOD

(71) Applicant: Teal Rainsky Rogers, Medford, OR (US)

(72) Inventor: Teal Rainsky Rogers, Medford, OR (US)

( * ) Notice: Subject to any disclaimer, the term of this patent is extended or adjusted under 35 U.S.C. 154(b) by 200 days.

(21) Appl. No.: 13/962,405

(22) Filed: Aug. 8, 2013

(51) Int. Cl.
*G06F 17/20* (2006.01)
*G06F 17/22* (2006.01)

(52) U.S. Cl.
CPC .............................. *G06F 17/2247* (2013.01)

(58) Field of Classification Search
CPC ..... G06F 17/2247; G06F 17/24; G06F 17/211
See application file for complete search history.

(56) References Cited

U.S. PATENT DOCUMENTS

| 6,205,485 | B1 | 3/2001 | Kikinis | |
| 6,300,957 | B1* | 10/2001 | Rao et al. | 345/441 |
| 6,470,383 | B1* | 10/2002 | Leshem | G06F 11/32 |
| | | | | 707/E17.116 |
| 8,111,255 | B2 | 2/2012 | Park | |
| 8,456,467 | B1 | 6/2013 | Hickman et al. | |
| 8,694,531 | B1* | 4/2014 | Stearns | G06F 17/30761 |
| | | | | 707/732 |
| 2002/0174087 | A1* | 11/2002 | Hao et al. | 707/1 |
| 2003/0130982 | A1* | 7/2003 | Kasriel | G06F 17/3089 |
| 2003/0208323 | A1* | 11/2003 | Hao et al. | 702/41 |
| 2007/0276807 | A1* | 11/2007 | Chen | G06F 17/30112 |
| 2008/0235622 | A1* | 9/2008 | Chand | G06Q 30/02 |
| | | | | 715/811 |
| 2008/0266289 | A1 | 10/2008 | Park | |
| 2009/0089714 | A1* | 4/2009 | Blake et al. | 715/850 |
| 2010/0153372 | A1* | 6/2010 | Kim | 707/722 |
| 2011/0221745 | A1 | 9/2011 | Goldman et al. | |
| 2012/0158715 | A1* | 6/2012 | Maghoul et al. | 707/728 |
| 2013/0024764 | A1 | 1/2013 | Lou et al. | |
| 2013/0090101 | A1 | 4/2013 | Park et al. | |
| 2013/0144566 | A1 | 6/2013 | De Biswas | |
| 2013/0166568 | A1* | 6/2013 | Binkert | G06F 17/30911 |
| | | | | 707/741 |

OTHER PUBLICATIONS

J. Lamping et al., "The Hyperbolic Browser: A Focus+Context Technique for Visualizing Large Hierarchies," (1996).*
T. Munzner et al., "Visualizing the Structure of the World Wide Web in 3D Hyperbolic Space," Aug. 31, 2000 [online] [available at http://graphics.stanford.edu/papers/webviz/htmlnosplit/] (retrieved Dec. 17, 2015).*

(Continued)

*Primary Examiner* — Shahid K Khan
(74) *Attorney, Agent, or Firm* — Jerry Haynes Law (57) ABSTRACT

A three-dimensional network mapping system that includes a database; a web crawler interfacing with the database, the web crawler adapted to visit a website and download website content data relating to the website to the database; and a user interface interfacing with the database, the user interface adapted to form a three-dimensional website map by orienting the website content data in an organized three-dimensional web page structure representing a layout of the website. A three-dimensional network mapping method is also disclosed.

26 Claims, 6 Drawing Sheets

(56) References Cited

OTHER PUBLICATIONS

T. Munzner et al., "Visualizing the Structure of the World Wide Web in 3D Hyperbolic Space," Aug. 31, 2000 [online] [available at http://graphics.stanford.edu/papers/webviz/htmlnosplit/] (retrieved Jun. 18, 2015).*

T. Munzner et al., "Visualizing the Structure of the World Wide Web in 3D Hyperbolic Space," Available at http://graphics.stanford.edu/papers/webviz/htmlnosplit/ (retrieved Jun. 18, 2015) (Year: 2000).*

* cited by examiner

THREE-DIMENSIONAL NETWORK MAPPING SYSTEM AND METHOD

FIELD OF THE INVENTION

Illustrative embodiments of the disclosure generally relate to systems and methods for mapping the Internet and other networks. More particularly, illustrative embodiments of the disclosure relate to a three-dimensional network mapping system and method for three-dimensional mapping of web pages from the Internet or other network.

BACKGROUND OF THE INVENTION

A conventional web browser displays web pages on a website one page at a time. A user can sequentially access the web pages by clicking a forward or backward button on the browser. If numerous web pages are sequentially accessed and viewed, the user may be required to click the backward button on the browser multiple times to reach a page which was previously accessed. Moreover, in some instances a user may desire to access and view web pages from multiple websites simultaneously.

In computer graphics, objects are represented three-dimensionally on a two-dimensional computer screen, enabling a viewer to comprehend more than one view of the object. Three-dimensional objects are generated using a collection of points in three-dimensional space and may be connected with triangles, lines or other entities. Methods are known for generating three-dimensional object data models which utilize point clouds and geometric shapes.

A three-dimensional network mapping system and method for three-dimensional mapping of web pages from the Internet or other network may be desirable for some applications.

SUMMARY OF THE INVENTION

Illustrative embodiments of the disclosure are generally directed to a three-dimensional network mapping system. An illustrative embodiment of the three-dimensional network mapping system includes a database; a web crawler interfacing with the database, the web crawler adapted to visit a website and download website content data relating the website to the database; and a user interface interfacing with the database, the user interface adapted to form a three-dimensional website domain by orienting the website content data in an organized three-dimensional organizational structure representing a layout of the website in a simulated three-dimensional environment.

Illustrative embodiments of the disclosure are further generally directed to a three-dimensional network mapping method. An illustrative embodiment of the method includes obtaining website content data relating to a website and forming a three-dimensional website domain by orienting the website content data in an organized three-dimensional web page structure representing a layout of the website in three-dimensional space.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
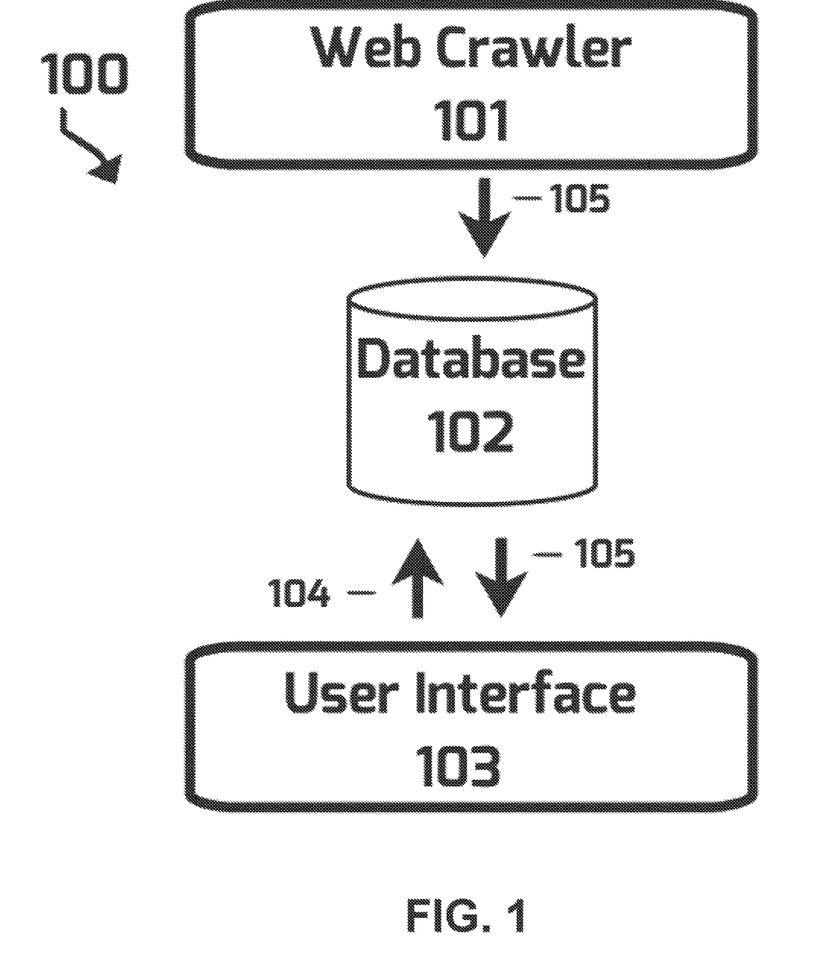
FIG. 1 is a block diagram which illustrates an illustrative embodiment of the three-dimensional network mapping system and method.

Referring initially to FIG. 1 of the drawings, an illustrative embodiment of the three-dimensional network mapping system, hereinafter system, is generally indicated by reference numeral 100. As will be hereinafter described, the system 100 may be adapted to retrieve website content data 105 which relates to linked websites, web pages or domains (hereinafter websites) on the Internet, generate a three-dimensional network map 500 which represents the layout of the website or websites and present the linked websites in the three-dimensional network map 500 (FIG. 5) in space on a display screen 103a (FIG. 5) of a user interface 103 such as a computer, smart phone or tablet, for example and without limitation. The system 100 may be built on a cross-platform game engine such as a 3D engine known as Unity 3D, for example and without limitation. While the system 100 will be described herein as applicable to linked websites on the Internet, it will be recognized and understood that the principles of the system and method may be amenable to other applications such as the three-dimensional network mapping of networks (such as routers and switches) or for visualizing the internal structures of software applications, for example and without limitation.

According to implementation of the system 100, websites may be attracted to each other when there is a link between them. The linked websites may be repelled by any non-linked websites which approach them in the three-dimensional space. Other simulated physical forces may also be applied to the websites, creating an organized three-dimensional website structure that represents the layout of the website or linked websites. A similar structure may also be created that shows how websites fit in with other websites to which they link.

As illustrated in FIG. 1, the system 100 may include a web crawler 101. A database 102 may interface with the web crawler 101. The user interface 103 may interface with the database 102.

The web crawler 101 may be hosted on a cloud server. The web crawler 101 is programmed to visit websites, download website content data 105 and "fuzz" the data 105. Fuzzing is a method which is used by web crawlers to throw away irrelevant bits of data and keep only important data. The web crawler 101 collects and stores the website content data 105 and store the data 105 in the database 102. The website content data 105 which the web crawler 101 collects and stores may include information regarding the size of the website, which pages the website contains, any links to other websites and any security vulnerabilities. The system may be implemented using any type of crawler known by those skilled in the art as long as the crawler is capable of supplying the required website content data 105.

The database 102 may be any type of database which is capable of storing the required website content data 105. In some embodiments, the database 102 may be a distributed "HBase" infrastructure which spreads the database across multiple servers for efficiency. HBase is a non-relational, distributed database modeled after Google's BigTable and written in Java. The database 102 stores the website content data 105 that the web crawler 101 collects and distributes the website content data 105 to the user interface 103 when a user (not illustrated) at the user interface 103 requests the website content data 105 in a three-dimensional format.

The user interface 103 may connect to the database 102 over the Internet. The user interface 103 may be configured to transmit to the database 102 an information packet 104 which requests website content data 105 that relates to the structure of a website obtained by the web crawler 101 and stored in the database 102. The information packet 104 may also request website content data 105 which specifies other details about the website that were requested by the user and are to be downloaded to the user interface 103. The database 102 is adapted to respond to the information packet 104 by transmitting the website content data 105 to the user interface 103. The user interface 103 may be configured to organize the website content data 105 and display the website content data 105 to the user in a three-dimensional format.

Figure 2:
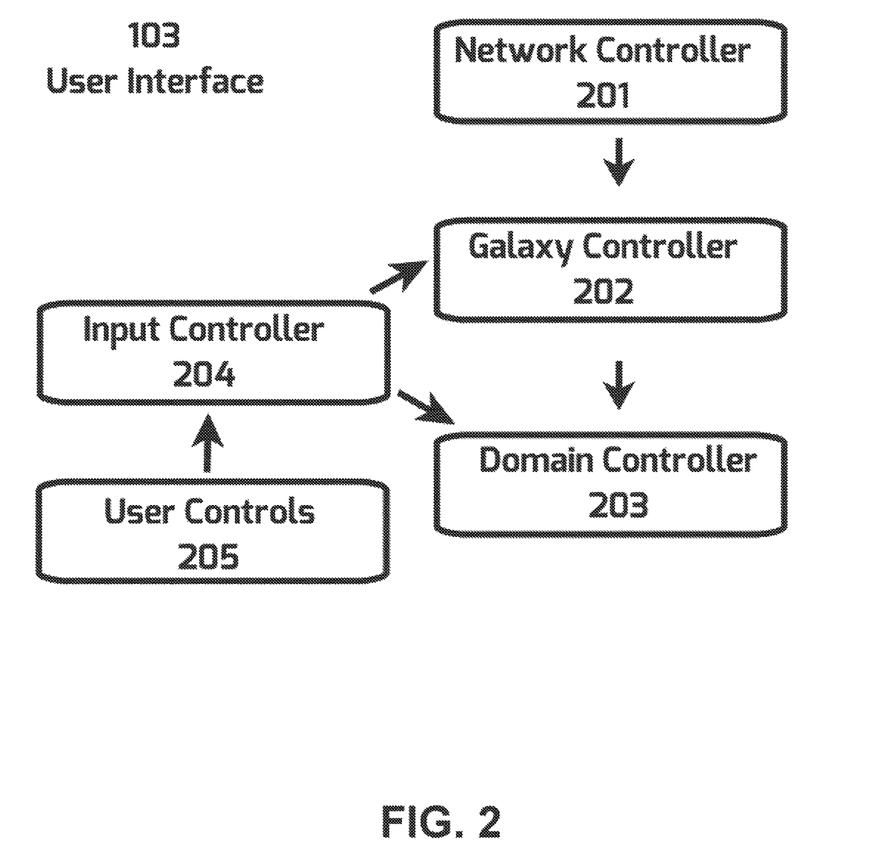
FIG. 2 is a block diagram which illustrates an exemplary user interface of the three-dimensional network mapping system and method.

Referring next to FIG. 2 of the drawings, an exemplary user interface 103 which is suitable for implementation of the system 100 is illustrated. The user interface 103 may include a network controller 201. A galaxy controller 202 may interface with the network controller 201. A domain controller 203 may interface with the galaxy controller 202. An input controller 204 may interface with the galaxy controller 202 and the domain controller 203. The input controller 204 may include user controls 205 which enable a user to operate the system 100.

The network controller 201 of the user interface 103 may communicate with the database 102 (FIG. 1) over the Internet. The network controller 201 may transmit information packets 104 to and receive website content data 105 from the database 102. The network controller 201 may also maintain a stable connection with the database 102 over the Internet. When it has received new website content data 105 from the database 102, the network controller 201 accesses a data recipient component 304 (FIG. 3) on the galaxy controller 202, as will be hereinafter described.

The galaxy controller 202 of the user interface 103 may place the web pages into three-dimensional space and coordinate the relationships of multiple domains, websites or web pages in a website to each other in the three-dimensional space. The domain controller 203 of the user interface 103 may coordinate the movement and behavior of web pages and links between web pages within a domain.

The input controller 204 of the user interface 103 may process user input. The user controls 205 of the input controller 204 may include controls for rotating the view, zooming in and out, clicking on objects, dragging objects and double-clicking on objects, for example and without limitation. The user controls 205 may vary depending on the type of device (computer/laptop, web browser, smart phone, etc.) on which the system 100 is deployed.

When the user zooms in or out past a certain defined zoom level the input controller 204 may send a message to the galaxy controller 202 telling it to behave in either System View, if the screen has been zoomed in close, or Galaxy View, if it is further away.

Figure 3:
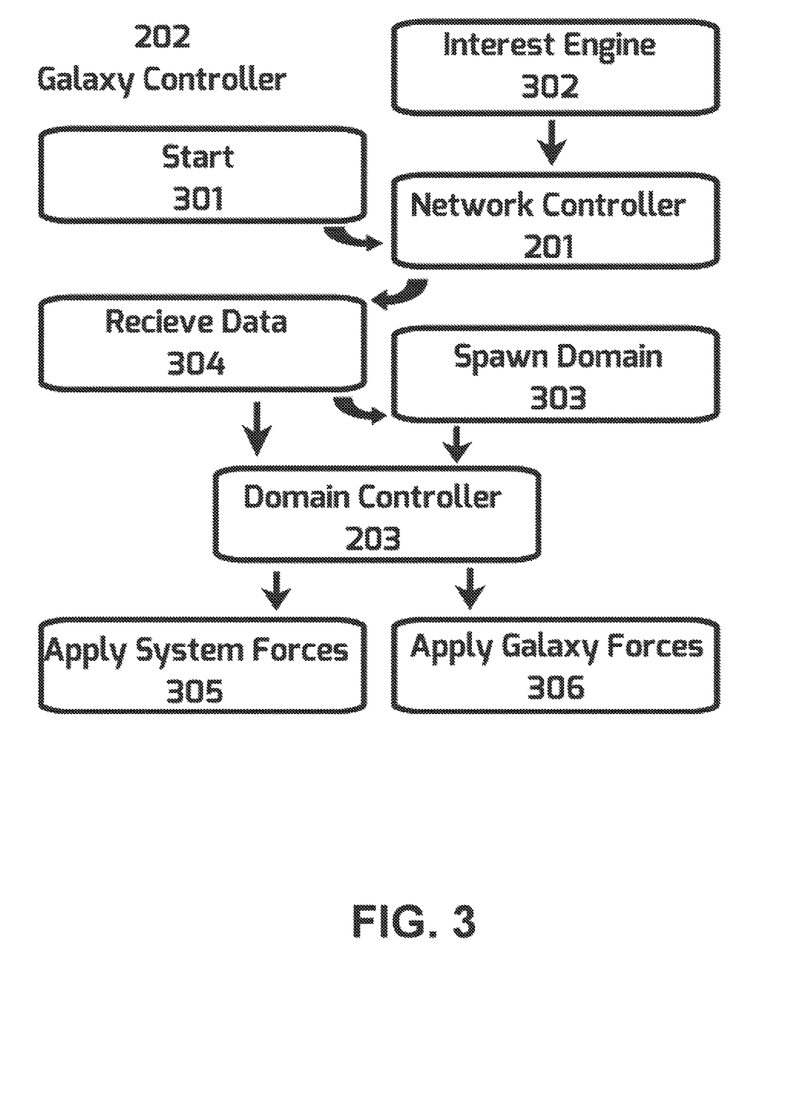
FIG. 3 is a block diagram which illustrates an exemplary galaxy controller of the three-dimensional network mapping system and method.

Referring next to FIG. 3 of the drawings, an exemplary galaxy controller 202 which is suitable for the user interface 103 (FIG. 2) is illustrated. The galaxy controller 202 may include a progenitor component 301 which interfaces with the network controller 201. An interest value engine 302 may interface with the network controller 201. A data recipient component 304 may interface with the network controller 201. A spawner domain 303 may interface with the data recipient component 304. A domain controller 203 may interface with the spawner domain 303 and the data recipient component 304. The galaxy controller 202 may also include an system forces application component 305 and a galaxy forces application component 306 which interface with the network controller 201.

The progenitor component 301 of the galaxy controller 202 may load a predetermined starting domain or website. The progenitor component 301 may also transmit a query to the network controller 201 for additional information on the domain.

The interest value engine 302 of the galaxy controller 202 may start when the application is initiated and may be configured to run periodically, such as every two seconds, for example and without limitation. The interest value engine 302 may add interest to whichever domain the user is focusing on (currently-focused domain) and may also add a smaller amount of interest to the domains that are linked to the currently-focused domain. The interest value engine 302 may normalize the total interest values across all domains such that the total interest assigned does not exceed a defined cap. When a domain accumulates sufficient interest value, the interest value engine 302 may transmit a request to the network controller 201 to retrieve additional information on that domain.

The data recipient component 304 of the galaxy controller 202 may receive website content data 105 (FIG. 1) from the network controller 201 and transmit the retrieved website content data 105 to the spawn domain 303. The spawner domain 303 spawns the website content data 105, or creates the domain and places it onto three-dimensional space, generating a three-dimensional (3D) website domain.

The system forces application component 305 applies forces that act on the 3D website domain when the user zooms the 3D website domain into system view. Forces in the 3D environment are created by defining a direction and a strength (together these two elements are called a vector) and telling the 3D engine to apply that force to a specific object in 3D space. The system forces application component 305 may load when the application loads and may continually update the forces periodically (forces may be recalculated as often as 50 times per second, for example and without limitation). The system forces application component 305 may apply the following forces to every 3D website domain:

(1). Compression: Force=The domain's position*−1*compression constant;

(2). Cross domain pull/push: Force=h*(r*s/m)−p. This calculation is called for each domain that exists (d) and other domains that also exist (od). Heading (h) is the vector from od to d. (s) is the size (number of pages) of d. Repulsion (r) and Pull (p) are constants. (m) is the magnitude of h.

(3). Domain separator: Force=h*(r/m). This calculation is called for each domain that is currently showing pages (d) and other domains that exist (od). Heading (h) is the vector from od to d, ignoring the vertical axis. (m) is the magnitude of h.

The galaxy forces application component 306 may load when the application loads and may continually update the forces (forces may be recalculated as often as 50 times per second, for example and without limitation). The galaxy forces application component 306 may apply the forces that act on the domain when the user zooms the 3D website domain into galaxy view. The galaxy forces application component 306 may apply the following forces to every domain:

(1). Compression: Force=The domain's position*−1*compression constant;

(2). Origin force: The position of the current domain in focus (ignoring the vertical component) times the cohesion constant;

(3). Cross domain pull/push: Force=h*(r*s/m)−p. This calculation is called for each domain that exists (d) and other domains that also exist (od). Heading (h) is the vector from od to d. (s) is the size (number of pages) of d. Repulsion (r) and Pull (p) are constants. (m) is the magnitude of h.

Figure 4:
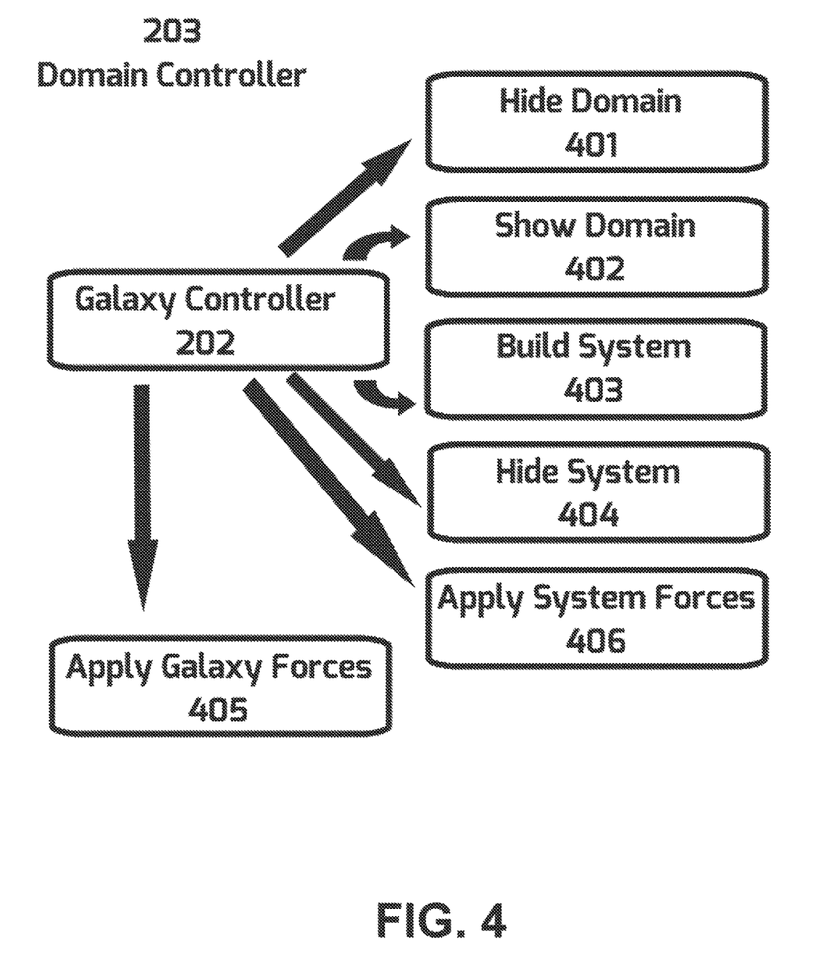
FIG. 4 is a block diagram which illustrates an exemplary domain controller of the three-dimensional network mapping system and method.

Referring next to FIG. 4 of the drawings, an exemplary domain controller 203 suitable for implementation of the user interface 103 (FIG. 2) is illustrated. The domain controller 203 may include a domain concealment component 401 and a domain display component 402 which interface with the galaxy controller 202. A system structure component 403 and a system concealment component 404 may interface with the galaxy controller 202. The domain controller 203 may also include an galaxy forces application component 405 and a system forces application component 406 which interface with the galaxy controller 202.

The domain concealment component 401 may disable all the display elements associated with a 3D website domain. The domain display component 402 may enable all the display elements associated with the current domain project. The system structure component 403 may hide the domain object and create all the pages associated with the current domain object. The system structure component 403 may launch the pages in a random direction in three-dimensional space, and the forces that are applied cause the launched pages to structure themselves. The system concealment component 404 may delete all the pages from view and show the domain object. The galaxy forces application component 405 may load when the domain is first spawned and may continually periodically update the forces (such as 50 times per second, for example and without limitation). The galaxy forces application component 405 may apply the forces that act on the pages associated with a domain when the domain is not spawned. In some embodiments, no pages may exist in this view; therefore, forces may not be applied to the pages. The system forces application component 406 may load when the domain is first spawned and may continually and periodically update the forces (such as 50 times per second, for example and without limitation). The system forces application component 406 may apply the forces that act on the pages associated with a domain when the domain is spawned. The system forces application component 406 may apply the following forces to every domain:

(1). Heading: Force on home=h*c. (h) is the vector of the domain position excluding the y axis. (c) is the cohesion constant;

(2). Buoyancy: Force=−y−(s−d)*h*b. (y) is the y value of the position of page. Surface (s) is a constant. Height of one level (h) is a constant. Depth (d) is how high the object should float. Buoyancy force (b) defines how much effect buoyancy should have and is a constant;

(3). Push/pull to home: Force=h*(r/m)−c. Every page receives a force attracting them to a particular distance away from the home page. Heading (h) is the vector from the current page to the home page. Repulsion (r) and cohesion (c) are constants. The magnitude of h is (m);

(4). Repulsion: Force=h*(r/m). This is applied from every page (p) to every other page (op). Heading (h) is the vector from p to op. Repulsion (r) is a constant. The magnitude of h is (m).

(5). Pull: Force (from)=−h*p; Any two pages that are linked are pulled closer to each other. Heading (h) is the vector from the origin of the link to the destination. Pull (p) is a constant;

(6). Pull: Force (to)=h*p.

Figure 5:
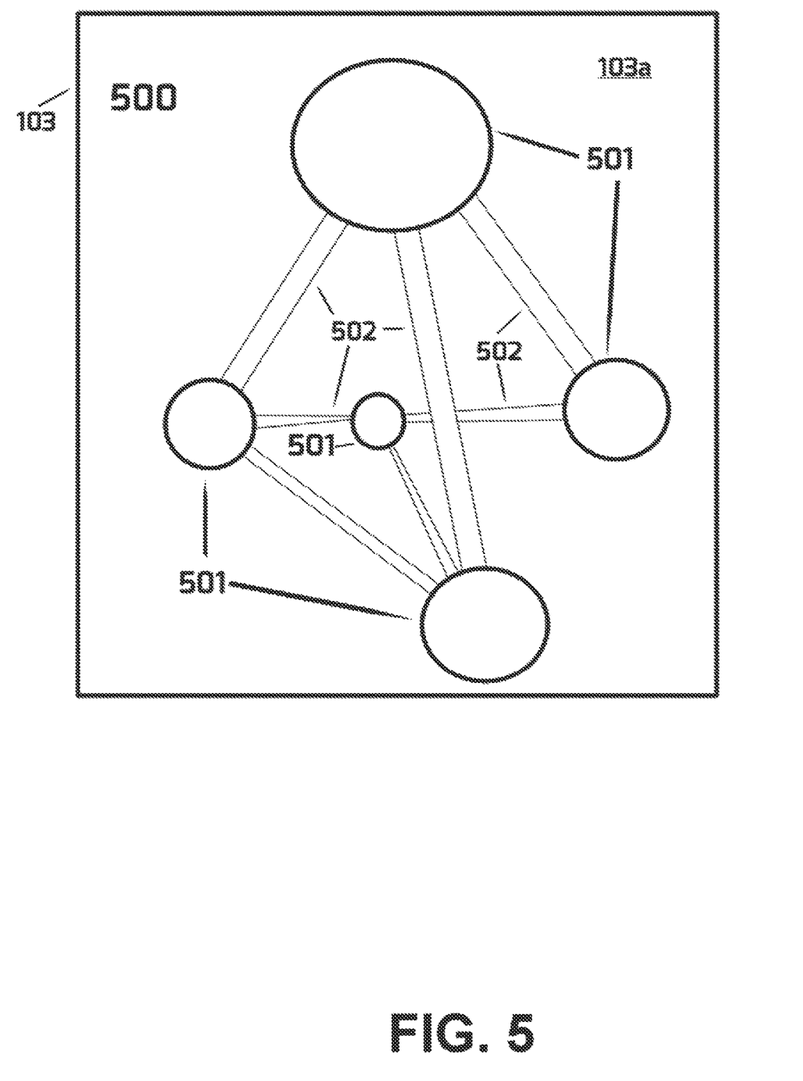
FIG. 5 is an exemplary three-dimensional network map generated according to an illustrative embodiment of the three-dimensional network mapping system and method.

Referring next to FIG. 5 of the drawings, an exemplary three-dimensional network map 500 generated according to an illustrative embodiment of the three-dimensional network mapping system and method 100 is illustrated. In exemplary application, the web crawler 101 (FIG. 1) visit websites, downloads website content data 105 and "fuzzes" the data 105. The retrieved website content data 105 is stored in the database 102. A user (not illustrated) operates the user interface 103 to retrieve selected website content data 105 from the database 102. The user interface 103 spawns the website content data 105 and presents the pages of the website in a three-dimensional network map 500 in space on a display screen of the user interface 103 by operation of the components which were heretofore described with respect to FIGS. 2-4. The multiple web pages or domains 501 which are of interest to a user are oriented in three-dimensional space. Links 502 may connect the domains 501 to each other in the three-dimensional network map 500.

Figure 6:
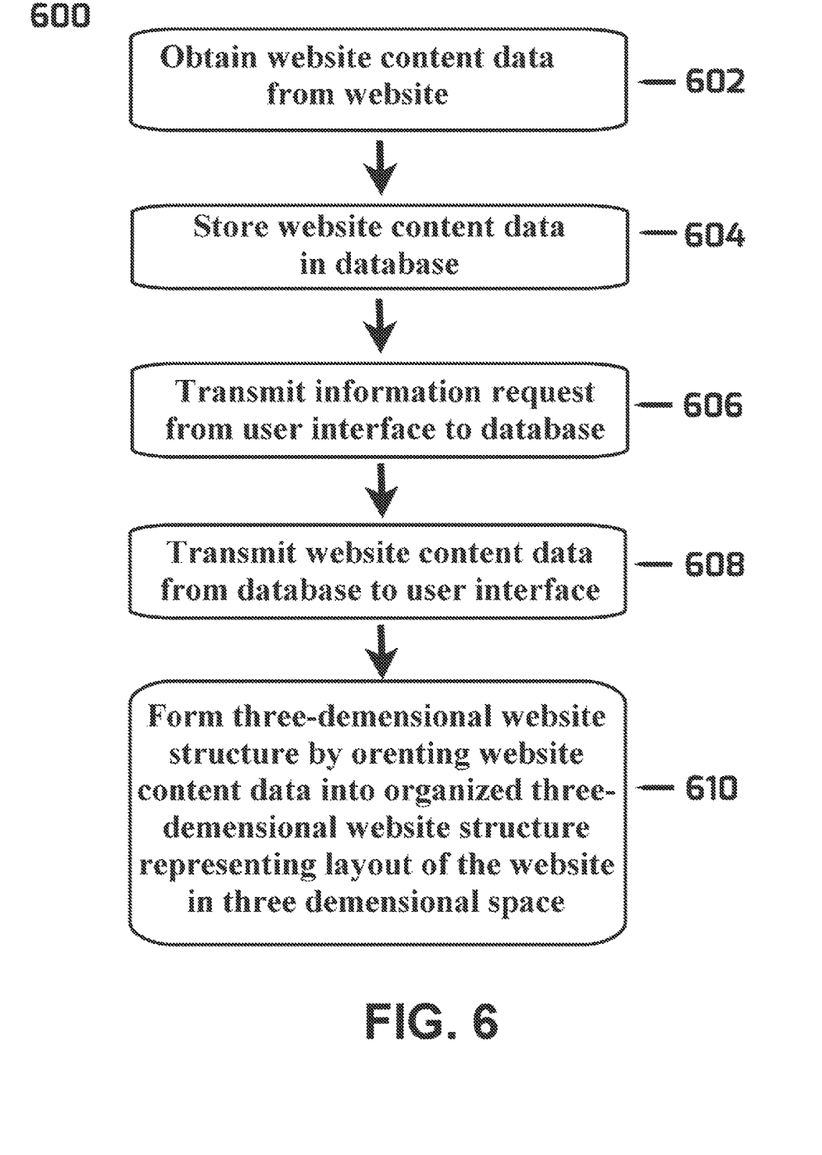
FIG. 6 is a flow diagram of an illustrative embodiment of a three-dimensional network mapping method.

Referring next to FIG. 6 of the drawings, a flow diagram 600 of an illustrative embodiment of a three-dimensional network mapping method is illustrated. In block 602, website content data relating to a website may be obtained. In block 604, the website content data may be stored in a database. In block 606, an information packet may be transmitted from a user interface to a database. The information packet may request website content data that relates to the structure of the website. In block 608, the website content data may be transmitted from the database to a user interface responsive to the information packet. In block 610, a three-dimensional website domain may be formed by orienting the website content data in an organized three-dimensional web page structure representing the layout of the website in three-dimensional space. Additional method steps may include those which were heretofore described with respect to the three-dimensional network mapping system 100 in FIGS. 1-5.

While the embodiments of the disclosure have been described above, it will be recognized and understood that various modifications can be made and the appended claims are intended to cover all such modifications which may fall within the spirit and scope of the disclosure.

What is claimed is:

1. A three-dimensional network mapping system, comprising:
a database;
a computer configured to execute:
a web crawler interfacing with the database, the web crawler adapted to visit a plurality of websites corresponding to a plurality of website domains and download website content data comprising web pages of each of the plurality of websites to the database;
a user interface interfacing with the database, the user interface adapted to form a three-dimensional (3D) representation each of the plurality of website domains by orienting the web pages of each of the plurality of websites in an organized three-dimensional (3D) web page structure representing a layout of the plurality of websites in a three-dimensional (3D) space;
wherein the user interface comprises a network controller interfacing with the database, a galaxy controller interfacing with the network controller, and a user input controller interfacing with the galaxy controller and the network controller, the galaxy controller adapted to place the web pages of each of the plurality of websites and three-dimensional (3D) representations of uniform resource locater (URL) links between the web pages into the 3D space and coordinate relationships of said web pages to each other in the 3D space, wherein the galaxy controller is further adapted to organize the web pages with respect to each other in the 3D space by using simulated physics forces;
an Interest Value Engine interfacing with the network controller, the Interest Value Engine adapted to monitor usage and maintain a plurality of interest values corresponding to the plurality of website domains that are periodically adjusted based on respective amounts of time each of the plurality of website domains has been selected by a user,
wherein the Interest Value Engine is further adapted to: determine a first interest value associated with a first website domain of the plurality of website domains based on an amount of time the first website domain has been currently selected by the user, determine a second interest value that is smaller than the first interest value of one or more other website domains that are linked via one or more of the URL links to the first website domain, normalize the first interest value and the second interest value across the first website domain and the one or more other website domains linked to the first website domain such that a total interest value does not exceed a predefined cap, and transmit a request to the network controller to retrieve additional information on one of the first website domain and the one or more other website domains when the one of the first website domain and the one or more other website domains accumulates a certain interest value;
a domain concealment component interfacing with the galaxy controller and the Interest Value Engine, the domain concealment component adapted to hide a 3D representation of the first website domain by disabling all display elements associated with the 3D representation of the first website domain, the Interest Value Engine being further adapted to send a message to the domain concealment component to remove all display elements associated with the 3D representation of the first website domain from display when the first interest value of the first website domain falls below a predefined interest value; and
a domain display component interfacing with the galaxy controller, the domain display component adapted to enable display of at least one display element associated with the 3D representation of the first website domain, the Interest Value Engine being further adapted to send a message to the domain display component to display the 3D representation of the first website domain when the first interest value of the first website domain rises above the predefined interest value.

2. The system of claim 1, wherein the database comprises a non-relational, distributed database infrastructure.

3. The system of claim 1, wherein the user interface is configured to transmit an information packet to the database requesting the website content data relating to a web page link structure and the database is adapted to transmit the website content data to the user interface responsive to receiving the information packet.

4. The system of claim 1, wherein the user interface connects to the database over an Internet Protocol network.

5. The system of claim 1, wherein the computer is further configured to execute a domain controller interfacing with the user input controller and the galaxy controller, the domain controller adapted to coordinate movement of the web pages and links between the web pages within each of the plurality of websites.

6. The system of claim 1, wherein the galaxy controller comprises a spawner domain component interfacing with the network controller, the spawner domain component adapted to place the web pages into the 3D space.

7. The system of claim 6, wherein the computer is further configured to execute a domain controller interfacing with the spawner domain component, the domain controller adapted to coordinate movement of the web pages and the URL links between the web pages.

8. A three-dimensional network mapping system, comprising:
a database;
a computer configured to execute:
a web crawler interfacing with the database, the web crawler adapted to visit a plurality of websites corresponding to a plurality of website domains and download website content data comprising web pages of each of the plurality of websites to the database; and
a user interface interfacing with the database, the user interface adapted to form a three-dimensional (3D) representation of each of the plurality of website domains by orienting the web pages of each of the plurality of websites in an organized three-dimensional (3D) web page structure representing a layout of the plurality of websites in a three-dimensional (3D) space, the user interface including:
a network controller interfacing with the database,
a galaxy controller interfacing with the network controller, the galaxy controller having a spawner domain component interfacing with the network controller and adapted to place the web pages of each of the plurality of websites into the 3D space, the galaxy controller adapted to coordinate relationships of the web pages of the plurality of websites to each other in the 3D space, wherein the galaxy controller is further adapted to organize the web pages of each of the plurality of websites with respect to each other in the 3D space by using simulated physics forces, a user input controller interfacing with the galaxy controller, wherein the user input controller includes controls for expanding or contracting a field of view, a domain controller interfacing with the user input controller and the galaxy controller, wherein the domain controller is adapted to coordinate movement of the web pages in the 3D space; and wherein the galaxy controller further comprises an Interest Value Engine interfacing with the network controller, the Interest Value Engine adapted to monitor usage and maintain a plurality of interest values corresponding to the plurality of website domains that are periodically adjusted based on respective amounts of time each of the plurality of website domains has been selected by a user, wherein the Interest Value Engine is further adapted to:

determine a first interest value associated with a first website domain of the plurality of website domains based on an amount of time the first website domain has been currently selected by the user, determine a second interest value that is smaller than the first interest value of one or more other website domains that are linked via one or more uniform resource locator (URL) links to the first website domain, normalize the first interest value and the second interest value across the first website domain and the one or more other website domains linked to the first website domain such that a total interest value assigned to a particular website domain does not exceed a predefined cap, and transmit a request to the network controller to retrieve additional information on one of the first website domain and the one or more other website domains when the one of the first website domain and the one or more other website domains accumulates a certain interest value;

a domain concealment component interfacing with the galaxy controller, the domain concealment component adapted to hide a 3D representation of the first website domain by disabling all display elements associated with the 3D representation of the first website domain, the Interest Value Engine being further adapted to send a message to the domain concealment component to remove the 3D representation of the first website domain from display when the first interest value falls below a predefined interest value; and a domain display component interfacing with the galaxy controller, the domain display component adapted to enable display of at least one display element associated with the 3D representation of the first website domain, the Interest Value Engine being further adapted to send a message to the domain display component to display the 3D representation of the first website domain when the first interest value rises above the predefined interest value.

9. The system of claim 8, wherein the database comprises a non-relational, distributed database infrastructure.

10. The system of claim 8, wherein the user interface is configured to transmit an information packet to the database requesting the website content data relating to the organized 3D web page structure and the database is adapted to transmit the website content data to the user interface responsive to receiving the information packet.

11. The system of claim 8, wherein the user interface connects to the database over an Internet Protocol network or other network.

12. The system of claim 8, wherein the galaxy controller further comprises a system forces application component, the system forces application component adapted to apply forces on a 3D representation of a particular website domain when the user zooms the particular website domain into system view.

13. The system of claim 8 wherein the galaxy controller further comprises a galaxy forces application component, the galaxy forces application component adapted to apply forces on a 3D representation of a particular website domain when the user zooms the particular 3D website domain into galaxy view.

14. A three-dimensional network mapping system, comprising:

a database;

a computer configured to execute:

a web crawler interfacing with the database, the web crawler adapted to visit a plurality of websites corresponding to a plurality of website domains and download website content data comprising web pages of each of the plurality of websites to the database;

a user interface interfacing with the database, the user interface adapted to form a three-dimensional (3D) representation each of the plurality of website domains by orienting the web pages of each of the plurality of websites in an organized three-dimensional (3D) web page structure representing a layout of the plurality of website domains in a three-dimensional (3D) space, and the user interface including:

a network controller interfacing with the database, a galaxy controller interfacing with the network controller, the galaxy controller having:

a progenitor component interfacing with the network controller, the progenitor component adapted to load a predetermined starting website, a spawner domain component interfacing with the progenitor component and adapted to place the web pages of each of the plurality of websites into the 3D space, the galaxy controller adapted to coordinate relationships of the web pages of each of the plurality of websites to each other in the 3D space, a data recipient component interfacing with the network controller and the spawner domain component, the data recipient component adapted to receive the website content data from the network controller and transmit the website content data to the spawner domain component, a domain controller interfacing with the spawner domain component and the data recipient component, the domain controller adapted to coordinate movement of the web pages within the 3D space, a system forces application component, the system forces application component adapted to apply forces on a 3D representation of a particular website domain when a user zooms the particular website domain into system view, a galaxy forces application component, the galaxy forces application component adapted to apply forces on a 3D representation of a particular website domain when the user zooms the particular website domain into galaxy view, an Interest Value Engine interfacing with the network controller, the Interest Value Engine adapted to monitor usage and maintain a plurality of interest values corresponding to the plurality of website domains that are periodically adjusted based on respective amounts of time each of the plurality of website domains has been selected by the user,
wherein the Interest Value Engine is further adapted to: determine a first interest value associated with a first website domain of the plurality of website domains based on an amount of time the first website domain has been currently selected by the user, determine a second interest value that is smaller than the first interest value of one or more other website domains that are linked via one or more uniform resource locator (URL) links to the first website domain, normalize the first interest value and the second interest value across the first website domain and the one or more other website domains linked to the first website domain that are currently monitored by the Interest Value Engine such that a total interest value assigned to the plurality of website domains does not exceed a predefined cap, and transmit a request to the network controller to retrieve additional information on one of the first website domain and the one or more other website domains when the one of the first website domain and the one or more other website domains accumulates a certain interest value, the galaxy controller further adapted to organize the web pages with respect to each other in the 3D space by using simulated physics forces;
a domain concealment component interfacing with the galaxy controller and the Interest Value Engine, the domain concealment component adapted to hide a 3D representation of one of the other website domains when it receives a message from the Interest Value Engine by disabling all display elements associated with the 3D representation of the one of the other website domains, the Interest Value Engine being further adapted to send a message to the domain concealment component to remove the 3D representation of the one of the other website domains from display when the second interest value of the one of the other website domains falls below a predefined interest value;
a domain display component interfacing with the galaxy controller, the domain display component adapted to enable display of at least one display element associated with the 3D representation of the first website domain, the Interest Value Engine being further adapted to send a message to the domain display component to display the 3D representation of the first website domain when the first interest value of the first website domain rises above the predefined interest value, and
a user input controller interfacing with the galaxy controller, the user input controller includes controls for expanding or contracting a field of view.

15. The system of claim 14, wherein the database comprises a non-relational, distributed database infrastructure.

16. The system of claim 14, wherein the user interface is configured to transmit to the database an information packet to the database requesting the website content data relating to the organized 3D web page structure and the database is adapted to transmit the website content data to the user interface responsive to receiving the information packet.

17. The system of claim 14, wherein the user interface connects to the database over an Internet Protocol network or other network.

18. The system of claim 14, wherein the domain controller includes:

a system structure component interfacing with the galaxy controller, the system structure component adapted to create web pages and place them in the 3D space; and
a system concealment component interfacing with the galaxy controller, the system concealment component adapted to hide the created web pages from view.

19. A three-dimensional network mapping method, comprising:
obtaining website content data comprising web pages of each of a plurality of websites corresponding to a plurality of website domains and downloading the website content data to a database;
forming a three-dimensional (3D) representation of each of the plurality of website domains by orienting the web pages of each of the plurality of websites in an organized three-dimensional (3D) web page structure representing a layout of the plurality of websites in a three-dimensional (3D) space;
interfacing an Interest Value Engine with a network controller, wherein the Interest Value Engine:
monitors a level of user interest and maintains a plurality of interest values corresponding to the plurality of website domains that are periodically adjusted based on respective amounts of time each of the plurality of website domains has been selected by a user,
determines a first interest value associated with a first website domain of the plurality of website domains based on an amount of time the first website domain has been currently selected by the user, determines a second interest value that is smaller than the first interest value of one or more other website domains linked via one or more uniform resource locator (URL) links to the first website domain, normalizes the first interest value and the second interest value across the first website domain and the one or more other website domains linked to the first website domain such that a total interest value assigned does not exceed a predefined cap, and retrieves additional information on one of the first website domain and the one or more other website domains when the one of the first website domain and the other website domains accumulates a certain interest value;
organizing the web pages of the website content data with respect to each other in the 3D space by using simulated physics forces;
hiding a 3D representation of the first website domain by disabling all display elements associated with the first website domain when the first interest value falls below a predefined interest value;
enabling the 3D representation of the first website domain by enabling all display elements associated with the first website domain when the first interest value rises above the predefined interest value.

20. The method of claim 19, wherein obtaining website content data relating to a particular website comprises downloading the website content data relating to the particular website to the database.

21. The method of claim 20, wherein forming a three-dimensional website domain comprises forming a three-dimensional website domain using a user interface interfacing with the database.

22. The method of claim 21, wherein forming a three-dimensional website domain using the user interface comprises forming a three-dimensional website domain using the user interface interfacing with the database over an Internet Protocol network.

23. The method of claim 21, further comprising transmitting an information packet from the user interface to the database, the information packet requesting the website content data relating to a web page link structure and further comprising transmitting the website content data from the database to the user interface responsive to the database receiving the information packet.

24. The method of claim 1, wherein the Interest Value Engine is further adapted to decrease an interest value of a particular website domain that is not currently selected by normalizing the total interest value across the plurality of website domains in the database.

25. The method of claim 8, wherein the Interest Value Engine is further adapted to decrease an interest value of a particular website domain that is not currently selected by normalizing the total interest value across the plurality of website domains in the database.

26. A three-dimensional network mapping system, comprising:
a database;
a computer configured to execute:
a web crawler interfacing with the database, the web crawler adapted to visit a website corresponding to a website domain and download website content data comprising web pages relating to the website to the database,
the web crawler including a user interface interfacing with the database, the user interface adapted to form a three-dimensional (3D) representation of the website domain by orienting the web pages in an organized three-dimensional (3D) web page structure representing a layout of the website in a three-dimensional (3D) space;
wherein the user interface comprises a network controller interfacing with the database, a galaxy controller interfacing with the network controller and a user input controller interfacing with the galaxy controller, the galaxy controller adapted to place the web pages and three-dimensional (3D) representations of one or more uniform resource locator (URL) links between the web pages into the 3D space and coordinate relationships of said web pages to each other in the 3D space, the galaxy controller further adapted to organize the web pages with respect to each other in the 3D space by using simulated physics forces;
an Interest Value Engine interfacing with the network controller, the Interest Value Engine adapted to run periodically, increment an interest value of the website domain by a certain amount based on an amount of time that a user has selected the website domain, increment an interest value of other website domains that are linked via one or more of the one or more URL links by a smaller amount, normalize interest values across the website domain and the other website domains linked to the website domain such that a total interest value does not exceed a predefined cap, and transmit a request to the network controller to retrieve additional information on one of the website domain and the other website domains when one of the website domain and the other website domains accumulates a certain interest value;
a domain concealment component interfacing with the galaxy controller, the domain concealment component adapted to hide the 3D representation of the website domain by disabling all display elements associated with the website domain; and
a domain display component interfacing with the galaxy controller, the domain display component adapted to enable the 3D representation of all display elements of the website domain;
wherein the simulated physics forces comprise formulae: (a) Compression Force=website domain position*−1*compression constant; (b) Origin force=position of the website domain (ignoring a vertical component) *cohesion constant; and (c) Cross domain pull/push Force=h*(r*s/m)−p, wherein the cross domain pull/push force is calculated for the website domain 'd' and the other website domains 'od', heading 'h' is a vector from 'od' to 'd', 's' is a size (number of pages) of website domain 'd', repulsion 'r' and pull 'p' are constants, and 'm' is a magnitude of 'h'.

* * * * *